US012731556B2

(12) United States Patent
Lee et al.

(10) Patent No.: US 12,731,556 B2
(45) Date of Patent: Sep. 8, 2026

(54) REFLECTIVE COLOR DISPLAY

(71) Applicant: SUPERC-TOUCH CORPORATION, New Taipei City (TW)

(72) Inventors: Hsiang-Yu Lee, New Taipei City (TW); Shang Chin, New Taipei City (TW); Ping-Tsun Lin, New Taipei City (TW); Chia-Cheng Lei, New Taipei City (TW); Kun-Yu Chen, New Taipei City (TW)

(73) Assignee: SUPERC-TOUCH CORPORATION, New Taipei City (TW)

( * ) Notice: Subject to any disclaimer, the term of this patent is extended or adjusted under 35 U.S.C. 154(b) by 0 days.

(21) Appl. No.: 19/239,223

(22) Filed: Jun. 16, 2025

(65) Prior Publication Data

US 2025/0384852 A1 Dec. 18, 2025

(30) Foreign Application Priority Data

Jun. 17, 2024 (TW) ................................ 113122357

(51) Int. Cl.
*G09G 3/34* (2006.01)
*G02F 1/167* (2019.01)
*G09G 3/20* (2006.01)

(52) U.S. Cl.
CPC ............. *G09G 3/344* (2013.01); *G02F 1/167* (2013.01); *G09G 3/2003* (2013.01); *G09G 2300/0452* (2013.01); *G09G 2320/0666* (2013.01)

(58) Field of Classification Search
CPC ................. G09G 3/344; G09G 3/2003; G09G 2300/0452; G09G 2320/0666; G02F 1/167
See application file for complete search history.

(56) References Cited

U.S. PATENT DOCUMENTS

2009/0237776 A1* 9/2009 Bouchard ............... G02F 1/167 359/296
2016/0163271 A1* 6/2016 Sakaigawa ........... G09G 3/3406 345/694

FOREIGN PATENT DOCUMENTS

JP 2004-302478 A 10/2004
JP 2009-44593 A 2/2009
KR 10-2011-0044292 A 4/2011
(Continued)

OTHER PUBLICATIONS

Paek, KR 20140074779 A machine translation, 2014 (Year: 2014).*
(Continued)

*Primary Examiner* — Peter D Mcloone
(74) *Attorney, Agent, or Firm* — Studebaker Brackett PLLC

(57) ABSTRACT

A reflective color display includes a first substrate having a first face and a second face, a color filter layer having a plurality of color filter units, and a second substrate having a third face and a fourth face, a display material layer sandwiched between the first substrate and the second substrate. Each of the color filter units includes a layer or multiple layers of filtering color blocks, and the filtering color blocks correspond to at least three different colors. In the visible light range of 380 nm~780 nm, at least two color filter units of different colors have full widths at half maximum more than 150 nm. The display material layer is filled with colloidal solution containing charged color particles with at least one color, or filled with liquid crystal material.

22 Claims, 9 Drawing Sheets

(56) References Cited

FOREIGN PATENT DOCUMENTS

| | | | |
|---|---|---|---|
| KR | 10-2012-0056246 | A | 6/2012 |
| KR | 10-2014-0074779 | A | 6/2014 |

OTHER PUBLICATIONS

Takahara, JP 2004302478 A machine translation, 2004 (Year: 2004).*
Joo, KR 20120046246 A machine translation, 2012 (Year: 2012).*
Nakamura, KR 20110044292 A machine translation, 2011 (Year: 2011).*

* cited by examiner 70
102
68
66
64
60B
62
60
60A
50
47
47
47
40B
48
46
44
40
42
40A

REFLECTIVE COLOR DISPLAY

CROSS-REFERENCE TO RELATED APPLICATION

This application claims benefit of priority to Taiwanese Patent Application No. 113122357 filed Jun. 17, 2024, the entire contents of which are incorporated herein by reference.

BACKGROUND OF THE INVENTION

Technical Field

The present invention relates to a color display, in particular to a reflective color display.

Description of Related Art

The ideal electronic paper needs to have advantages of lightweight, low energy consumption, and flexibility. In addition, electronic paper can retain images even after power off. Therefore, electronic paper has been widely used in applications such as books, labels, posters, bulletin boards, etc. In the past, various electronic paper technologies have been proposed, such as electronic powder fluid (quick response liquid powder display), cholesteric liquid crystal display and other displays. However, electrophoretic displays (EPDs) are still the mainstream in view of practical considerations such as image display quality, electronic drive system design complexity and mass production stability. In addition, with more desirable application, color electronic paper has gradually become a development focus.

Color electronic paper is color display with bistable feature. During maintaining display screen, the color electronic paper does not consume electric power. The color electronic paper only consumes electric power when updating display screen. In comparison with liquid crystal display (LCD) screens requiring continual electricity to maintain display, this allows the color electronic paper to significantly reduce the display's power consumption. The color electronic paper has advantages including environmental protection, power saving, eye protection and visibility in sunlight. The electronic paper and reflective LCD displays present images by reflecting ambient light, while the active light source of conventional backlit LCDs produces blue light. The reader will feel more comfortable for eyes and will be less likely to get tired when browsing electronic paper displays or reflective LCD displays.

The technologies of the current color electronic paper can be mainly classified into two categories. The first category imitates LCD and uses color photoresists (such as RGB three-color photoresists) on color filters to get colored light by filtering out part of the spectrum of white light. This technology only requires black and white electronic ink films with color filter. However, the technology suffers to a serious problem in that ⅔ of the incident white light is absorbed by the filtering color block and only ⅓ of the incident light is reflected, thus make the displayed screen dark. The traditional LCD can alleviate this problem by using high-brightness backlights to compensate the reduced brightness suffered by filtered light such that the image can maintain normal brightness. However, this scheme is at the expense of high energy consumption. The color electronic paper also suffers to dark display because it lacks the help of backlight. The industry has spent more than 10 years on research and development and cannot find suitable solution. The current color electronic paper using filter need to be equipped with front light to supplement the brightness. However, the front light is limited by the structure and reflection principle such that its effect is far inferior to that of the LCD backlight. Besides, the eye protection effect of the color electronic paper is greatly reduced if the front light is turned on.

The second category of technology uses four-color particles of Y (yellow), M (magenta), C (cyan), and W (white) colors to combine printing-type colors. However, these four-color particles must be arranged on at least two or three layers with accurate positions, and the RGB colors are mixed through the subtractive color mechanism. For example, if the upper layer particles are C (cyan color) particles, the middle layer particles are Y (yellow color) particles, and the W (white) medium in the lower layer reflects the filtered light back to the human eye, then the remaining light after the light passing through these two layers of particles and is absorbed twice is corresponding to the spectrum of green color. Using this second category of technology requires precise control of the layer height of nanoparticles for each color and preventing them from mixing together to cause color errors. However, this problem causes extremely high complexity of the driver IC. Besides, there are also problems of serious delays in screen updates, ghosting and screen flickering and so on. These are factors to cause the hindering for successfully commercializing color electronic paper.

The present invention is intended to solve the problem caused by insufficient brightness, so that the black and white electronic paper reader can be smoothly developed to color electronic paper reader.

According to one aspect of the present invention, the present invention employs three-color filtering color blocks (color photoresists) of Y (yellow), M (magenta), and C (cyan) to replace the traditional R (red), G (green), and B (blue) photoresists. Besides, the present invention also adopts a specific filtering color block configuration and a color algorithm to achieve the above-mentioned effect, thus provide a color mixing effect with enhanced brightness, which will be detailed later.

According to another aspect of the present invention, the present invention adopts six-color filtering color blocks (color photoresists) of Y (yellow), M (magenta), C (cyan), R (red), G (green), and B (blue) to replace the traditional R (red), G (green), and B (blue) photoresists, and adopts a specific filtering color block configuration (described later) and a color algorithm to achieve the above-mentioned effect, so as to provide a color mixing effect with increased brightness. The present invention integrates RGB filtering color blocks and CMY filtering color blocks into a more colorful palette to combine the advantages of both. When using RGB three-color filter unit to display one of the RGB three primary colors, only one sub-pixel among the three sub-pixels is illuminated, while the other two sub-pixels are black (without illumination). When using RGB three-color filter unit to display one of the CMY three colors, two sub-pixels among the three sub-pixels are illuminated, while the other one sub-pixel is black (without illumination). When using CMY three-color filter unit to display one of the RGB three primary colors, two sub-pixels among the three sub-pixels are illuminated, while the other one sub-pixel is black (without illumination). When using CMY three-color filter unit to display one of the CMY three colors, only one sub-pixel among the three sub-pixels is illuminated, while the other two sub-pixels are black (without illumination). The human eye is more sensitive to brightness and less sensitive to color, two black sub-pixels will cause visual brightness imbalance and form various texture effects. The present invention uses six color filter units of Y (yellow), M (magenta), C (cyan), R (red), G (green), and B (blue), namely a set of RGB filter units and a set of CMY filter units are used to form a new color display unit, with a total of 6 sub-pixels to display one RGB color pixel. Therefore, when displaying one of the six colors of RGBCMY, three sub-pixels are illuminated while the remaining three sub-pixels are black. The displayed colors will be more neutral and correct, and the texture will be less obvious, which is very suitable for large posters and billboards.

SUMMARY OF THE INVENTION

Accordingly, the present invention provides a reflective color display (100), comprising:

- a first substrate (10) comprising a first face (10A) and a second face (10B), a thin film transistor layer (30) arranged on the second face (10B) and comprising a plurality of thin film transistors (32), and a pixel electrode layer (PEL) arranged on the second face (10B) and comprising a plurality of pixel electrodes (PE);
- a color filter layer (CFA) comprising a plurality of color filter units (CF1, CF2, CF3), each of the color filter units (CF1, CF2, CF3) being formed by a filtering color block (C, M, Y), or a plurality of filter color blocks (C, M, Y) stacked to each other;
- wherein the plurality of filter units (CF1, CF2, CF3) are corresponding to at least three different colors, wherein within a visible light range of 380 nm~780 nm, at least two color filter units of different colors have full widths at half maximum (FWHM) more than 150 nm;
- a second substrate (12) comprising a third face (12A) and a fourth face (12B); and
- a display material layer (20) sandwiched between the first substrate (10) and the second substrate (12), the display material layer (20) being filled with a colloidal solution (24) containing charged color particles (26) of at least one color.

Accordingly, the present invention provides a reflective color display (102), comprising:

- a first substrate (40) comprising a first face (40A) and a second face (40B), a thin film transistor layer (46) arranged on the second face (40B) and comprising a plurality of thin film transistors (47), and a pixel electrode layer (PEL) arranged on the second face (40B) and comprising a plurality of pixel electrodes;
- a color filter layer (44) comprising a plurality of color filter units (CF1, CF2, CF3), each of the color filter units (CF1, CF2, CF3) being formed by a filtering color block (C, M, Y), or a plurality of filter color blocks (C, M, Y) stacked to each other;
- wherein the plurality of color filter units (CF1, CF2, CF3) are corresponding to at least three different colors, wherein within a visible light range of 380 nm~780 nm, at least two color filter units of different colors have full widths at half maximum (FWHM) more than 150 nm;
- a second substrate (60) comprising a third face (60A) and a fourth face (60B); and
- a display material layer (50) sandwiched between the first substrate (40) and the second substrate (60), the display material layer (50) being filled with a liquid crystal material.

Accordingly, the present invention provides a method for operating reflective color display (100), the reflective color display (100) comprising a display material layer (20), a pixel electrode layer (PEL) and a color filter layer (CFA), the pixel electrode layer (PEL) comprising a plurality of pixel electrodes (PE), pixels of the color display (100) being defined by the plurality of pixel electrodes (PE), the color filter layer (CFA) comprising a plurality of color filter units (CF1, CF2, CF3), each color filter unit (CF1, CF2, CF3) comprising one or more filtering color blocks (C, M, Y), the plurality of color filter units (CF1, CF2, CF3) comprising at least cyan, magenta and yellow color filter units, the method comprising:

- (a) reading original displayed RGB parameter values for a pixel;
- (b) setting the original displayed RGB parameter values to values C1, C2, and C3 from large to small, where the value C1 is a maximum value, the value C3 is a minimum value, and the value C2 is a middle value;
- (c) calculating white basic amount, CMY component, and RGB component based on the values C1, C2, and C3;
- (d) calculating displayed CMY display parameter values based on the white basic amount, the CMY component, and the RGB component; and
- (e) driving the corresponding pixel electrode layer based on the displayed CMY display parameter values to control relative brightnesses of the cyan, magenta, and yellow color filter units.

DETAILED DESCRIPTION

The technical contents of this invention will become apparent with the detailed description of embodiments accompanied with the illustration of related drawings as follows. It is intended that the embodiments and drawings disclosed herein are to be considered illustrative rather than restrictive.

Figure 1:
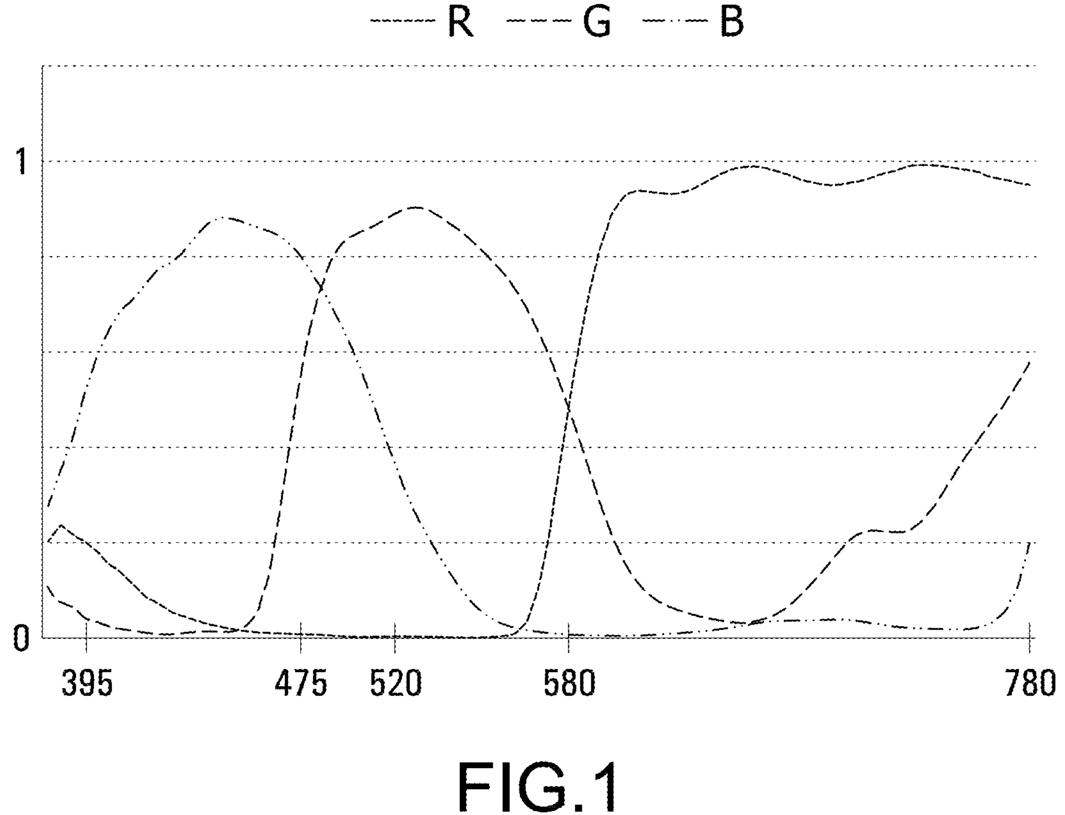
FIG. 1 shows the spectrum corresponding to the three primary colors of red, blue and green.

With reference to FIG. 1, this figure shows the spectrum corresponding to the three primary colors of red, blue and green. The light visible to human eyes belongs to the range of visible light having a wavelength range of 380 nm~780 nm. The blue light region of the current filtering color block occupies the shorter wavelength range on the leftmost side of the spectrum (395~520 nm), the green light occupies the middle wavelength range (475~580 nm), and the red light occupies the rightmost region with longest wavelength (580~780 nm).

Figure 2A:
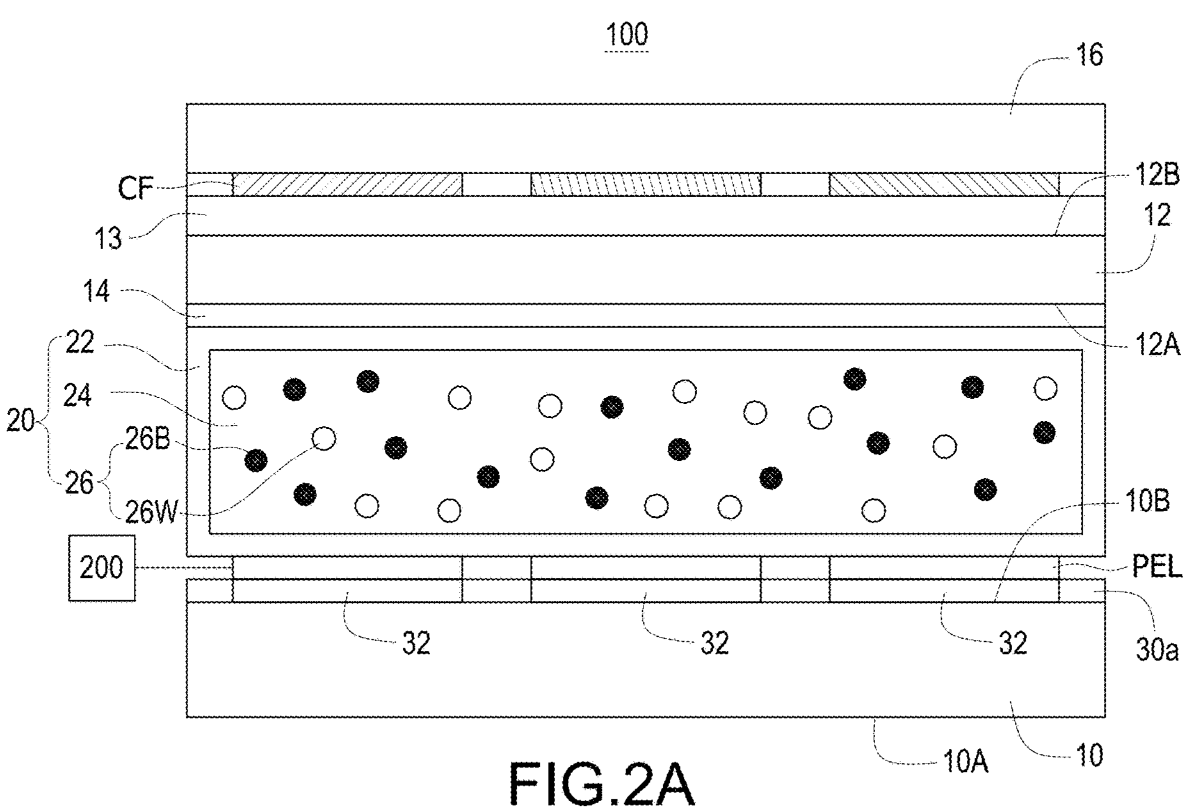
FIG. 2A is a cross-sectional view of a related-art electrophoretic display.

FIG. 2A is a cross-sectional view of a related-art electrophoretic display 100, where the electrophoretic display 100 is a color electrophoretic display 100. The electrophoretic display 100 includes, from top to bottom, an upper glass substrate 16, a color filter layer CF, an optical glue 13, an opposite substrate 12 (for example, a transparent plastic substrate including a third face 12A and a fourth face 12B), a common electrode layer 14 (for example, a transparent conductive electrode layer), an electrophoretic layer 20, a pixel electrode layer (control electrode layer) PEL, a driving circuit layer (not labelled and including a thin film transistor layer 30*a* and the thin film transistor layer 30*a* includes a plurality of thin film transistors 32) and a control substrate 10 (for example, it can be a glass substrate, and includes a first face 10A and a second face 10B).

In the structure shown in FIG. 2A, the viewing face is close to the direction of the opposite substrate 12. In addition, as shown in FIG. 2A, the electrophoretic layer 20 includes a plurality of hollow cavities 22 (only one is shown in this figure), and a colloidal solution 24 filled in each hollow cavity 22 contains a plurality of suspended charged color particles 26 (for example, charged black particles 26B and charged white particles 26W). The hollow cavity 22 structure is used as a container for electronic ink (or electrophoretic material). The hollow cavity 22 is, for example, a micro compartment formed by an organic polymer material and disposed on the opposite substrate 12. The micro compartment is used to contain the charged color particles 26. In addition, the charged color particles 26 can be a two-color combination (black/white) or white charged particles placed in a black colloidal solution.

In the structure shown in FIG. 2A, the electrophoretic display with a color filter layer array produces visual colors by area sharing and color mixing. The available display area is shared between three primary colors such as red/green/blue (RGB) or four primary colors such as or red/green/blue/white (RGBW). The filter layers can be arranged in one-dimensional (striped) or two-dimensional (2×2) repeating pattern. If the area of the three sub-pixels (for RGB display) or four sub-pixels (for RGBW display) is small enough, those sub-pixels can be mixed visually to form single pixel with uniform color with higher resolution. The inherent disadvantage of area sharing is that the colorant is always present. Besides, the color can only be adjusted by switching the corresponding pixels of the underlying monochrome display to be white or black, namely, by turning the corresponding primary color on or off. For example, in ideal RGBW display, each of the primary colors (red, green, blue, and white colors) occupies one quarter of a color pixel in the display area (a color pixel contains one of four sub-pixels). The white sub-pixel is as bright as the white sub-pixel area on the monochrome display below, and the combined contribution of the other three color sub-pixels is equivalent to that of one white sub-pixel. Therefore, the brightness of the four sub-pixels in the ideal RGBW display are equivalent to the brightness of two white sub-pixels, and the maximum color brightness thereof is ½ of the black and white display without filtering color.

Figure 2B:
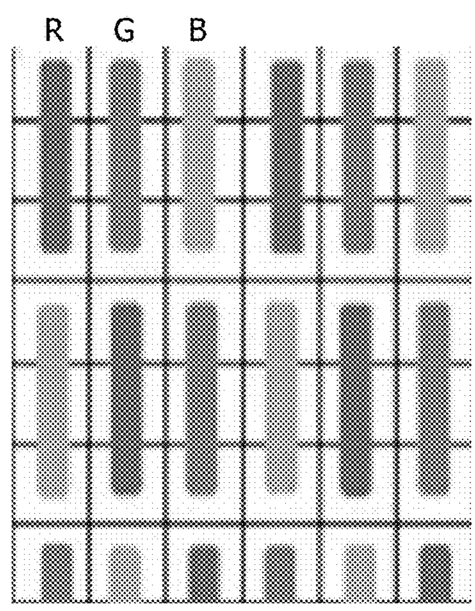
FIG. 2B shows a related-art RGB color filter layer array.

As shown in FIG. 2B, the color electronic paper the RGB color filter layer array has no backlight to supplement the brightness. In addition, the internal black and white charged particles have diffusion offset due to the different polarities of the adjacent electrodes when the internal black and white charged particles move. Therefore, the white nanoparticle area needing to reflect light is mixed with black nanoparticles, the light reflectivity is reduced and the brightness of the image is further attenuated. To solve these problems, the related-art technology reduces the area of the filtering color block within the pixel range. When the area without the filtering color block is illuminated, the color of the white nanoparticles will be displayed. The visible color range, which can be displayed by the related-art technology, is also reduced and the color saturation is sacrificed due to the reduced area of the filtering color block. The reduction ratio can be referred to the ratio of the colored part to the white part in FIG. 2B. For example, if the coverage area ratio of the filtering color block within the image range is 70%, equivalently there are 30% reduction in color and 30% increase in the white light area.

The present invention uses three filtering color blocks of Y (yellow), M (magenta), and C (cyan) colors. More particularly, the filtering color block of Y (yellow) color absorbs light component with blue wavelengths only and allows light component with green and red wavelengths to pass through; the filtering color block of M (magenta) color absorbs only light component with green wavelengths and allows light component with blue and red wavelengths to pass through; and the filtering color block of C (cyan) color absorbs only light component with red wavelengths and allows light component with blue and green wavelengths to pass through. Therefore, the amount of filtered-out light is reduced, the amount of transmitted light is increased, and the overall brightness increases.

Figures 3A, 3B:
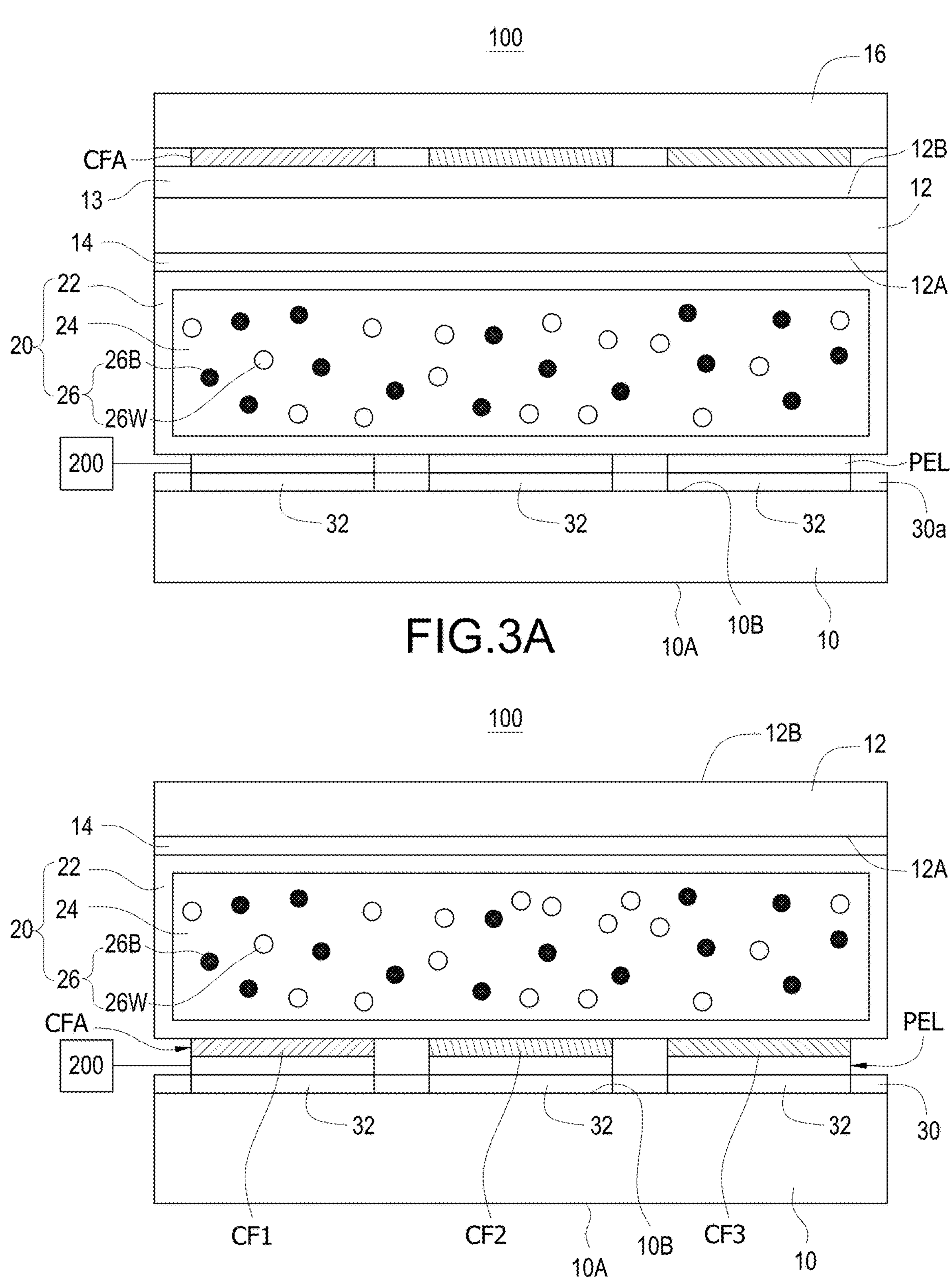
FIG. 3A shows a cross-sectional view of a reflective color display according to the present invention.
FIG. 3B is a cross-sectional view of the reflective color display according to another embodiment of the present invention.

FIG. 3A shows a cross-sectional view of a reflective color display 100 according to the present invention. The structure of the color display 100 is generally similar to that shown in FIG. 2A, but the color filter layer in FIG. 3A is a brightness-enhancing color filter layer CFA according to the present invention (described later). Furthermore, the reflective color display 100 further includes a display controller 200, which can convert the RGB parameters to be displayed into CMY parameters according to the conversion algorithm of the present invention, which will be described in detail later.

FIG. 3B is a cross-sectional view of the reflective color display 100 according to another embodiment of the present invention. The reflective color display 100 comprises, from bottom to top, a control substrate 10 (namely a first substrate and including a first face 10A and a second face 10B), a high aperture ratio driving circuit layer (including a thin film transistor layer 30 and the thin film transistor layer 30 including a plurality of thin film transistors 32), a pixel electrode layer PEL, a color filter layer CFA (namely, a brightness-enhancing color filter layer CFA according to the present invention and including color filter units CF1, CF2, CF3), an electrophoretic layer 20, a common electrode layer 14 (for example, a transparent conductive electrode layer, or an opaque metal conductive layer, and so on) and an opposite substrate 12 (namely, a second substrate including a third face 12A and a fourth face 12B). Similarly, the electrophoretic layer 20 includes a plurality of hollow cavities 22 (only one is shown in the figure), and a colloidal solution 24 containing a plurality of charged color particles 26 (such as charged black particles 26B and charged white particles 26W) filled in each of the hollow cavities 22. The hollow cavities 22 are, for example, micro cups, micro capsules, or a plurality of hollow cavities formed by micro-compartments of the first substrate made of organic polymer materials, and the micro cups, micro capsules and the hollow cavities are used to contain the charged color particles 26. According to other embodiments of the present invention (not shown), the hollow cavity 22 may also be filled with a colloidal solution 24, wherein the colloidal solution contains a colored fluid (for example, black fluid) and a plurality of charged particles of a single color (for example, white particles); or the colloidal solution contains a colorless fluid (for example, transparent fluid) and a plurality of charged particles with two colors (for example, white particles/black particles). The hollow cavity 22 serves as a container for the electronic ink. The detail of above-mentioned high aperture ratio driving circuit layer and manufacturing method for micro compartment can be referred to the work from the same applicant, for example, Taiwan invention patent publication TW202403420. For example, one way to achieve this high aperture ratio driving circuit layer is to increase the aperture ratio by replacing the non-transparent storage capacitor with a transparent conductive material, another way is to reduce the area of the thin film transistor TFT. Moreover, still another way is to limit the line width of the gate line and the line width of the data line to meet the high aperture ratio requirement. Furthermore, according to one embodiment of the present invention, the ratio of the gate channel width and gate channel length of the thin film transistor is 1:1. Namely, the gate channel length is equal to the gate channel width, this can also increase the aperture ratio of the electrophoretic display 100. The detail for achieving high aperture ratio driving circuit layer can be referred to refer to Taiwan invention patent publication TW202403420. In the color display 100 shown in FIG. 3B, the viewing face can be viewed from the side of the control substrate 10 closer to the thin film transistor layer 30, thereby improving the display refresh rate of the electrophoretic display 100 and solving the ghosting problem.

In the embodiments shown in FIGS. 3A and 3B, the plurality of pixel electrodes is respectively made of non-transparent metal material or transparent conductive material (such as ITO). The control substrate (first substrate) is a transparent substrate such as glass or PI. Furthermore, in the embodiment shown in FIG. 3B, along a direction from the first face 10A of the control substrate 10 into the display area of the color display 100, the aperture ratio of the control substrate of the color display 100 is not less than 70%. The charges on the transparent pixel electrodes PE attract the charged color particles with different polarity charges, and the attracted charged color particles are accumulated on a surface of the electrophoretic layer 20 (namely, the display material layer) close to the transparent pixel electrodes PE, thus form an image on the viewing face. Besides, in the embodiment shown in FIGS. 3A and 3B, the colloidal solution 24 may also include only charged white particles and a black solution. In other words, the colloidal solution 24 does not include charged black particles.

Figure 3C:
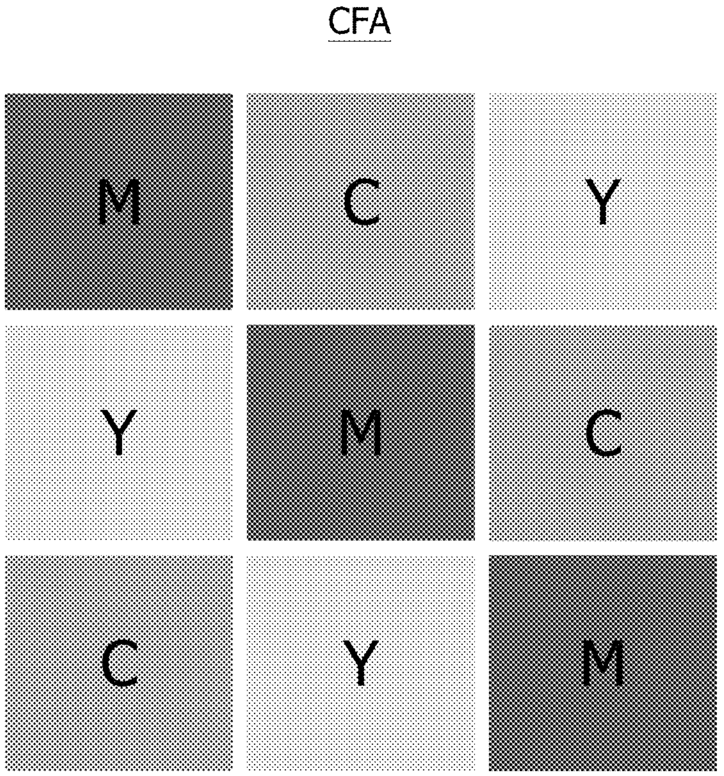
FIG. 3C is a top view of the brightness-enhancing color filter layer CFA according to an embodiment of the present invention.

FIG. 3C is a top view of the brightness-enhancing color filter layer CFA according to an embodiment of the present invention. According to the present invention, the brightness-enhancing color filter layer CFA includes a plurality of color filter units, and each color filter unit includes one or more filtering color blocks. The filtering color blocks are, for example, a yellow filtering color block Y, a magenta filtering color block M, and a cyan filtering color block C. As shown in FIG. 3C, the yellow filtering color block Y, the magenta filtering color block M, and the cyan filtering color block C almost occupy the area of the entire pixel. Besides, the three filtering color blocks CMY pass more light (allow the transmission of more light) than the filtering color block RGB. Therefore, the brightness-enhancing color filter layer CFA according to the present invention can increase brightness without reducing the color in light, so the image quality can be better than the existing technology (see below for details). Furthermore, according to another embodiment of the present invention, there may be a gap between the color filter units in the brightness-enhancing color filter layer CFA. Besides, FIG. 3C is only a top view for the brightness-enhancing color filter layer CFA, and each color filter unit may include one or more stacked layers of filtering color blocks. For example, although only the top layer of the magenta filtering color block M of the magenta filter unit is shown, the embodiment of the present invention may also include other layer(s) of magenta filtering color block(s) M under the top magenta filtering color block M, and the configuration of the filtering color blocks of other colors may be deduced in the same manner.

Figure 3D:
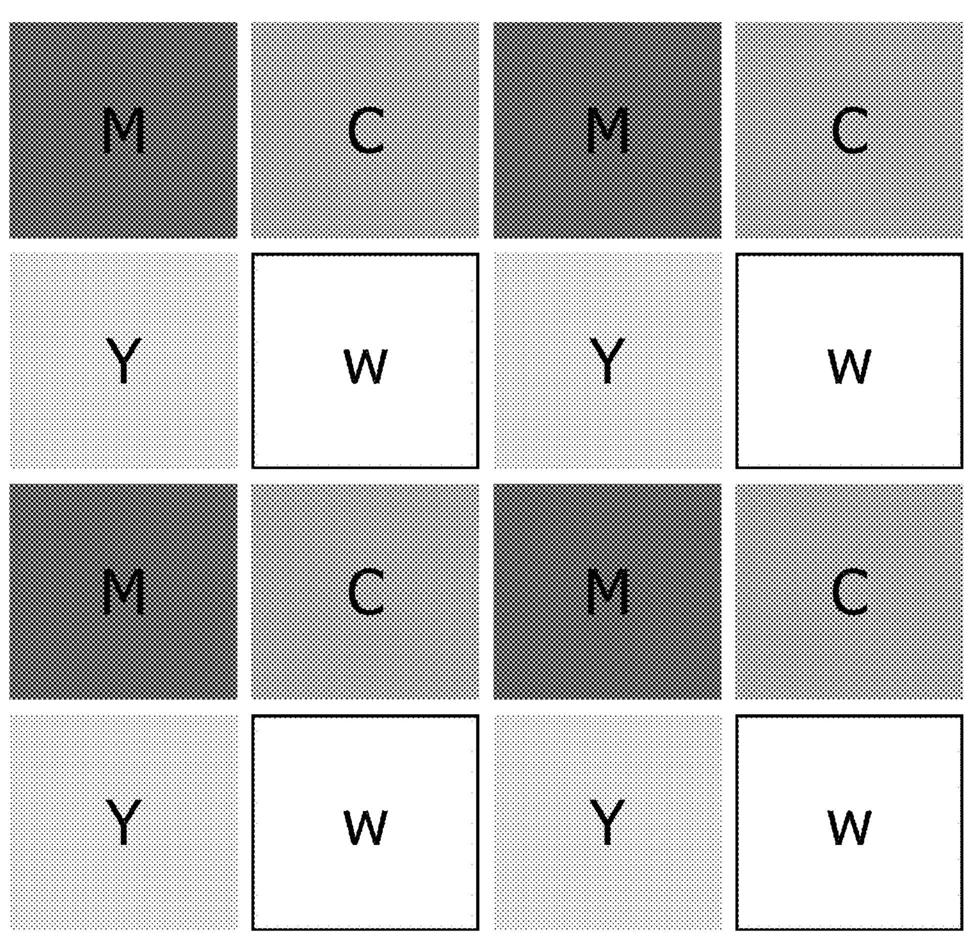
FIG. 3D is a top view of the brightness-enhancing color filter layer CFA according to another embodiment of the present invention.

FIG. 3D is a top view of the brightness-enhancing color filter layer CFA according to another embodiment of the present invention. According to the present invention, the brightness-enhancing color filter layer CFA includes a plurality of color filter units, and each color filter unit includes one or more filtering color blocks. The filtering color blocks are, for example, a yellow filtering color block Y, a magenta filtering color block M, a cyan filtering color block C, and a colorless filtering color block W. As shown in FIG. 3D, the yellow filtering color block Y, the magenta filtering color block M, the cyan filtering color block C, and the colorless filtering color block W almost occupy the area of the entire pixel. Besides, the four filtering color blocks CMYW pass more light (allow the transmission of more light) than the filtering color block RGB. Therefore, the brightness-enhancing color filter layer CFA according to the present invention can increase brightness without reducing the color in light, so the image quality can be better than the existing technology (see below for details). Furthermore, according to another embodiment of the present invention, there may be a gap between the color filter units in the brightness-enhancing color filter layer CFA. Besides, FIG. 3D is only a top view for the brightness-enhancing color filter layer CFA, and each color filter unit may include one or more stacked layers of filtering color blocks. For example, although only the top layer of the magenta filtering color block M of the magenta filter unit is shown, the embodiment of the present invention may also include other layer(s) of magenta filtering color block(s) M under the top magenta filtering color block M, and the configuration of the filtering color blocks of other colors may be deduced in the same manner.

Figure 3E:
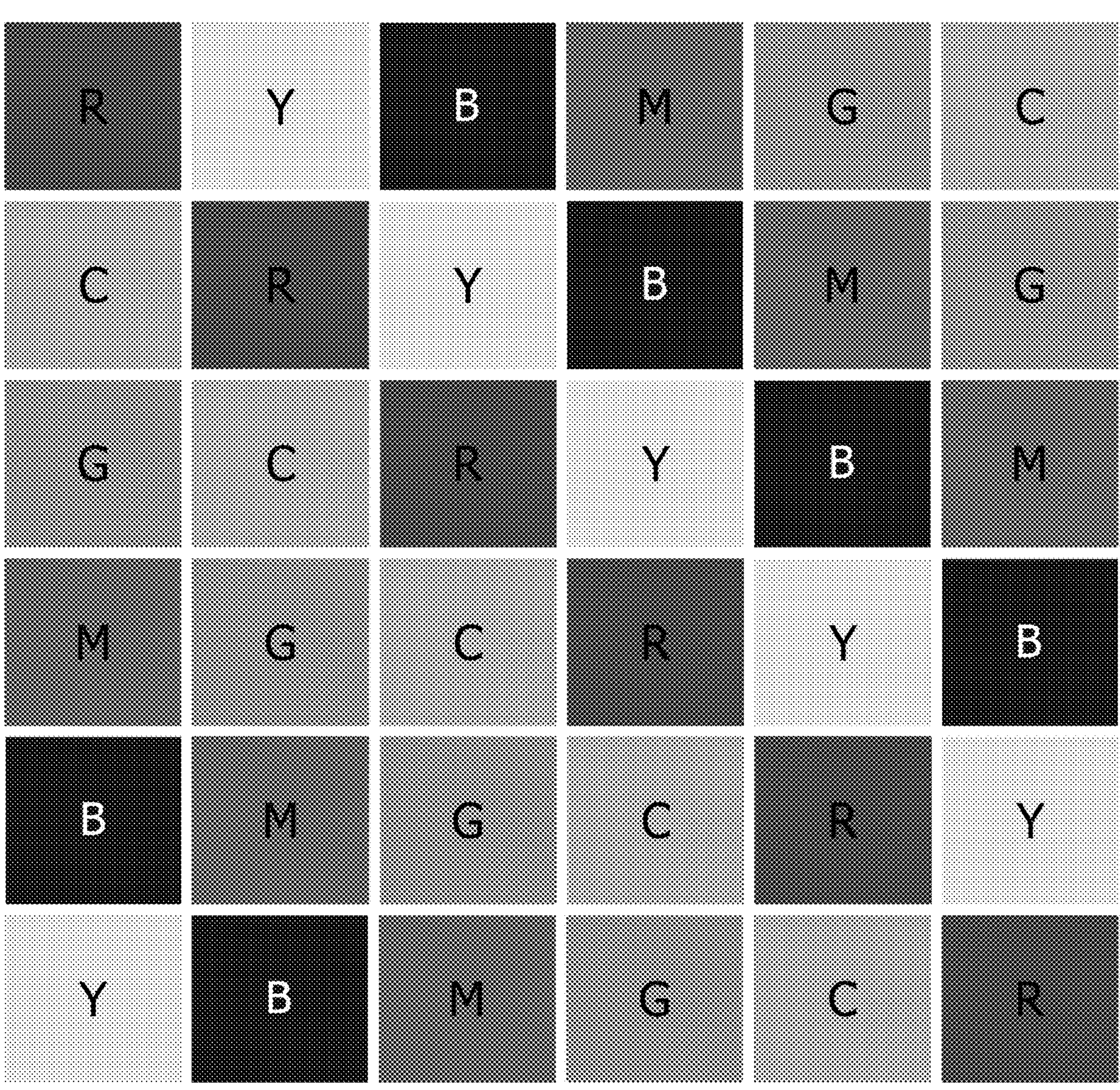
FIG. 3E is a top view of the brightness-enhancing color filter layer CFA according to another embodiment of the present invention.

FIG. 3E is a top view of the brightness-enhancing color filter layer CFA according to still another embodiment of the present invention. According to the present invention, the brightness-enhancing color filter layer CFA includes a plurality of color filter units, and each color filter unit includes one or more filtering color blocks. The filtering color blocks are, for example, a yellow filtering color block Y, a magenta filtering color block M, a cyan filtering color block C, a red filtering color block R, a green filtering color block G and a blue filtering color block B. As shown in FIG. 3E, all of the above-mentioned filtering color blocks almost occupy the area of the entire pixel. Furthermore, in the brightness-enhancing color filter layer CFA shown in FIG. 3E, a set of RGB filter units and a set of CMY filter units are combined to form a new set of color display units, with a total of 6 sub-pixels to display one RGB color pixel. Therefore, when any one color in the six colors of RGBCMY is displayed, among the RGBCMY filtering color block (sub-pixels), three sub-pixels will be illuminated, and the remaining three sub-pixels will be black. The displayed color is more neutral and correct, and the texture is less noticeable. This is suitable for large posters and billboards application. Furthermore, according to another embodiment of the present invention, there may be a gap between the color filter units in the brightness-enhancing color filter layer CFA. Besides, FIG. 3E is only a top view for the brightness-enhancing color filter layer CFA, and each color filter unit may include one or more stacked layers of filtering color blocks. For example, although only the top layer of the magenta filtering color block M of the magenta filter unit is shown, the embodiment of the present invention may also include other layer(s) of magenta filtering color block(s) M under the top magenta filtering color block M, and the configuration of the filtering color blocks of other colors may be deduced in the same manner.

According to an embodiment of the present invention, each color filter unit is formed by a single-layer filtering color block. More specifically, even if the filtering color block of the present invention is implemented to be multi-layer filtering color block, the colors of the upper and lower filtering color blocks are the same. Therefore, there is no subtractive filtering process. On the contrary, in the CMY filter mechanism of the related art technology, the colors of the upper and lower filtering color blocks are different, and the RGB colors are mixed by applying the subtractive color filtering process. Therefore, the CMY filter mechanism of the related art technology further attenuates the brightness of the light. In the embodiments shown in FIGS. 3C, 3D and 3E, within the visible light range (380 nm to 780 nm), the full widths at half maximum (FWHM) of the at least two color filter units of different colors respectively exceed 150 nm.

Example 1: Display Pixel has Color of Yellow (Y)

Please refer to FIG. 2B and FIG. 3C. It is assumed that in the related art technology of FIG. 2B, the coverage rate of the filtering color block RGB is 0.7; namely, the area of the filtering color block RGB occupies 70% of the pixel area. For displaying the color of yellow (Y), it is necessary to illuminate the sub-pixels corresponding to the red filtering color block R and the green filtering color block G (R=1, B=0, G=1) to mix into the yellow color. Besides, it is further assumed that the light amounts and areas of red filtering color block R and the green filtering color block G with respect to the white light are calculated based on light intensity of 1 W (the intensity of white light in unit area of one pixel). The total light and distribution area are:

$$(0.7R+0.3W)+(0.7G+0.3W)=0.7(R+G)+0.6W=0.7Y+0.6W$$ (the result of 0.7 unit area of yellow light plus 0.6 unit area of white light).

The above example is compared with respect to the embodiment of the present invention shown in FIG. 3C, namely, the filtering color block CMY in the brightness-enhancing color filter layer CFA of the present invention. It is assumed that the coverage ratio of the filtering color block CMY in FIG. 3C is 1. Namely, the area of the filtering color block CMY occupies 100% of the pixel area (this means that the gaps between the filtering color blocks CMY are very small and can be ignored). For displaying the color of yellow (Y), the yellow filtering color block Y of the present invention is also calculated with 1 W (the intensity of white light in unit area of one pixel), and the magenta filtering color block M and the cyan filtering color block C are calculated with certain grayscale (for example, the grayscale brightness within the unit area of one pixel is 0.3), namely in the condition of C=0.3, M=0.3, Y=1, then the total light and distribution area are:

$$C+Y+M=0.3C+1Y+0.3M=0.3(B+G)+1(R+G)+0.3(B+R)=0.6B+1.3G+1.3R=0.7(G+R)+0.6(R+G+B)=0.7Y+0.6W.$$

The above two examples (the color filter layers in related art and the present invention) have the same performance when displaying yellow color, and the same results are obtained when displaying cyan color and magenta color.

In the above-mentioned example corresponding to FIG. 3, because the light transmitted by the magenta filtering color block M and the cyan filtering color block C can be mixed with the light from the yellow filtering color block Y to form white light W in color addition mechanism, the magenta filtering color block M and the cyan filtering color block C are illuminated with equal amount of light (for example, a grayscale of 0.3) to improve the overall display brightness.

Example 2: Display Pixel has Color of White (W)

Please refer to FIG. 2B and FIG. 3C. It is assumed that in the related art technology of FIG. 2B, the coverage rate of the filtering color block RGB is 0.7; namely, the area of the filtering color block RGB occupies 70% of the pixel area. For displaying the color of white (W), it is necessary to illuminate the sub-pixels corresponding to the red filtering color block R, the green filtering color block G, and the blue filtering color block B (R=1, B=1, G=1) to mix into the white color. Besides, it is further assumed that the light amounts and areas of the red filtering color block R, the green filtering color block G, and the blue filtering color block B with respect to the white light are calculated based on light intensity of 1 W (the intensity of white light in unit area of one pixel, namely one pixel area). The total light and distribution area are:

$$(0.7R+0.3W)+(0.7G+0.3W)+(0.7B+0.3W)=0.7(R+G+B)+0.9W=0.7W+0.9W=1.6W$$ (the result presented by 1.6 pixel areas of white light).

The above example is compared with respect to the embodiment of the present invention shown in FIG. 3C, namely, the filtering color block CMY in the brightness-enhancing color filter layer CFA of the present invention. It is assumed that the coverage ratio of the filtering color block CMY in FIG. 3C is 1. Namely, the area of the filtering color block CMY occupies 100% of the pixel area (this means that the gaps between the filtering color blocks CMY are very small and can be ignored). For displaying the color of white (W), the yellow filtering color block Y, the magenta filtering color block M and the cyan filtering color block C are calculated with 1 W (the intensity of white light in unit area of one pixel, namely one pixel area), namely in the condition of C=1, M=1, Y=1, the total light and distribution area are:

$$1C+1Y+1M=1(B+G)+1(R+G)+1(B+R)=2(R+G+B)=2W.$$

When displaying white, the brightness of the present invention is 2 W, which is better than the 1.6 W brightness of the related art.

Example 3: Display Pixel has Color of Green (G)

Please refer to FIG. 2B and FIG. 3C. It is assumed that in the related art technology of FIG. 2B, the coverage rate of the filtering color block RGB is 0.7; namely, the area of the filtering color block RGB occupies 70% of the pixel area. For displaying the color of green (G), it is assumed that the light amount of green filtering color block G is calculated based on light intensity of 1 W (the intensity of white light in unit area of one pixel, namely one pixel area), namely, R=0, B=0, G=1. The total light and distribution area are:

$$0.7G+0.3W$$

The above example is compared with respect to the embodiment of the present invention shown in FIG. 3C, namely, the filtering color block CMY in the brightness-enhancing color filter layer CFA of the present invention. It is assumed that the coverage ratio of the filtering color block CMY in FIG. 3C is 1. For displaying the color of green (G), the magenta filtering color block M and the cyan filtering color block C are calculated with 1 W (the intensity of white light in unit area of one pixel, namely one pixel area), namely C=1, M=0, Y=1. The total light and distribution area are:

$$1C+1Y=1(B+G)+1(R+G)=2G+R+B=1G+(R+G+B)=1G+1W$$

In the above two examples, the color saturation ratio of the CMY filter mechanism of the present invention to the color saturation ratio of the RGB filter mechanism is 1:0.7, the white brightness ratio of the CMY filter mechanism of the present invention to the white brightness ratio of the RGB filter mechanism is 1 W:0.3 W.

In other words, when displaying the three primary colors of RGB, the CMY filter mechanism of the present invention can brighten the light by 333% compared to the related-art RGB filter mechanism. When displaying white color, the CMY filter mechanism of the present invention can brighten the light by 25% compared to the related-art RGB filter mechanism. When displaying the three colors of CMY, the CMY filter mechanism of the present invention has the same performance as the related-art RGB filter mechanism.

In general, when there is no front light and the light source is only provided by reflected light, the CMY filter mechanism of the present invention can improve the brightness compared to the related art RGB filter mechanism.

RGB to CMY Algorithm

Figure 4:
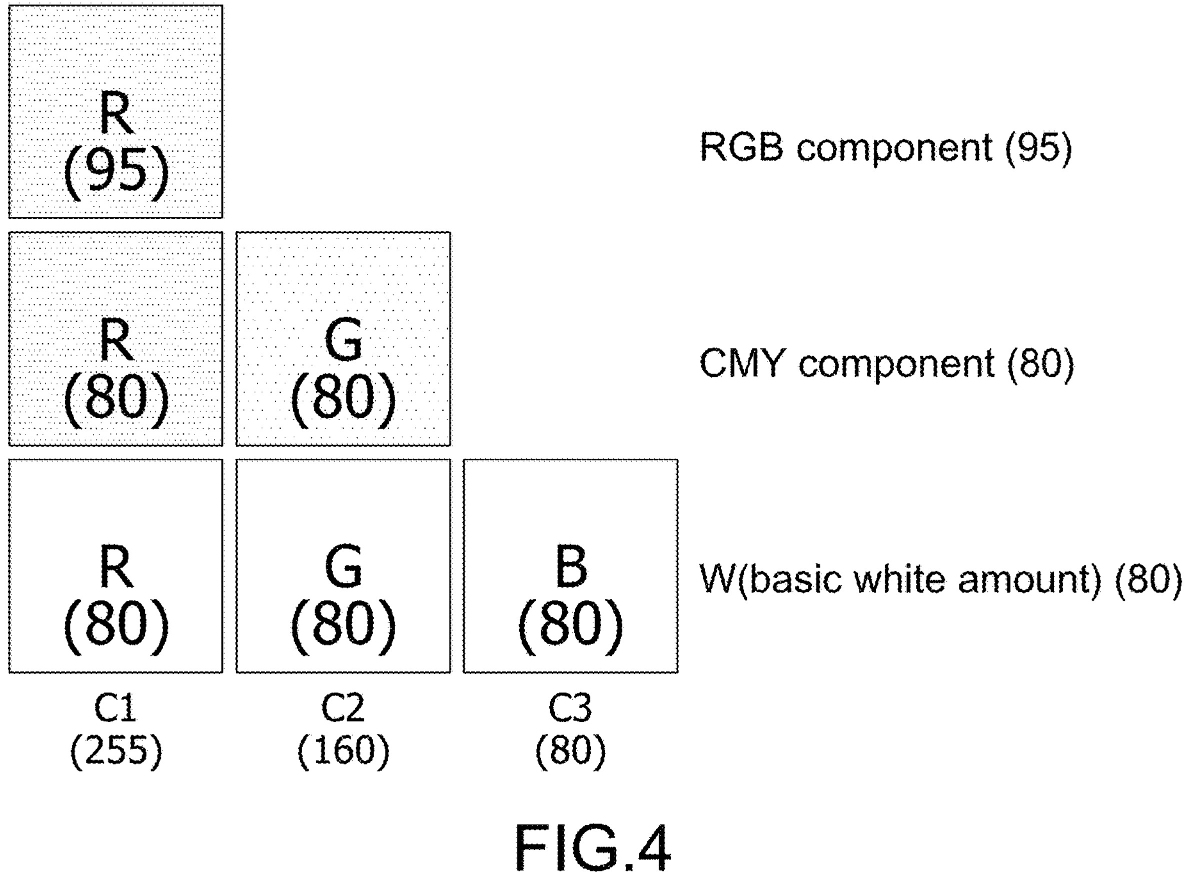
FIG. 4 illustrates the algorithm for converting RGB parameters to CMY parameters according to the present invention.

Please refer to FIG. 4, this figure is used to illustrate the algorithm for converting RGB parameters to CMY parameters according to the present invention.

The CMY filtering mechanism of the present invention uses color superposition method instead of color subtraction mechanism, so the existing RGB to CMY conversion method cannot be used for color conversion in the architecture of the present invention. The conversion process of the present invention has the effect of increasing brightness. The color subtraction mechanism of the related art technology does not have the function of increasing brightness, so the method of the present invention is different from the related art technology.

1. Find the original parameter values of the three primary colors RGB and set the original parameter values as values C1, C2, and C3 based on the order from large value to small value, where C1 is the maximum value, C3 is the minimum value, and C2 is the middle value.
2. Among above values, C3 represents the white component, namely the basic white amount after conversion.
3. The value C2-C3 is the CMY component. Since the result of C2-C3 is calculated from picking two colors among the three primary colors RGB, the result is corresponding to one color of the CMY colors.
4. The value C1-C2 is the remaining RGB component, and each RGB component will be presented with two colors of CMY components.
5. After adding the above three components, the final CMY values can be respectively obtained, which are the driving parameter values corresponding to the original parameter values required by the CMY filter mechanism of the present invention.

RGB to CMY Conversion Example

Figures 5A, 5B:
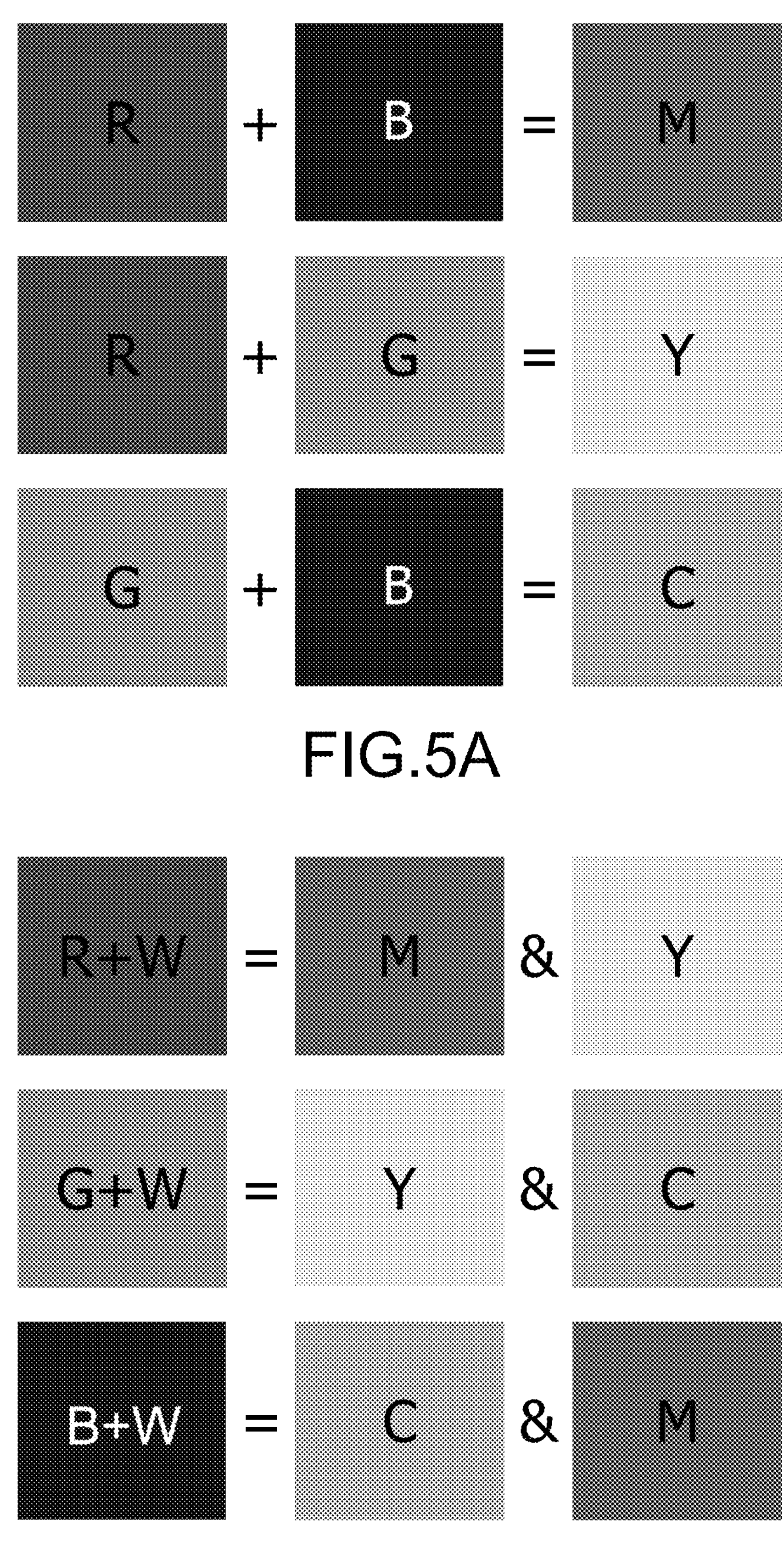
FIG. 5A is a schematic view showing conversion of RGB color into CMY color.
FIG. 5B is a schematic view showing conversion of CMY color into RGB color plus white color.

Please refer to FIGS. 4, 5A and 5B. When the display parameters of a pixel are R=255, G=160, B=80, a display controller 200 (such as the controller 200 shown in FIGS. 3A and 3B) first calculates the relevant parameters according to FIG. 4 and the above process. Namely, the corresponding values are C1=255, C2=160, and C3=80.

Afterward, referring to FIG. 4, the basic white amount (white component), the CMY components, and RGB components are calculated. Namely:

The basic white amount is C3=80 (the basic while amount in all three CMY filtering color blocks)

The CMY component is C2−C3=160−80=80 (the component belonging to one of the CMY filtering color blocks. In this case the CMY component is Y component).

The RGB component is C1−C2=255−160=95 (corresponding to the remaining RGB components, two filtering color blocks in the three filtering color blocks CMY are used to combine the RGB components plus the brightness of white. In this example, the RGB component is the R component, and the two filtering color blocks M and Y will be used to produce the color of R plus white).

Referring to FIG. 5A again, according to the original parameter values R=255, G=160, B=80, the main components in the second item (CMY component) are provided by colors R and G because the colors R and G have larger parameter values. The original parameter value of color R (red) is the largest, so the original parameter value of color R subtracts the corresponding basic white amount and the result is combined with the color G (green) to form the color Y (yellow). The main component of the second item is the color Y (yellow), Y=80, and the values of M and C for the CMY components are 0.

Furthermore, referring to FIG. 4, the RGB component is C1−C2=255−160=95, and the component is the color R (red). Referring again to FIG. 5B, the component of the color R can be obtained by mixing the component Y and the component M to form R (red)+W (white). Therefore, in the RGB component, C=0, Y=95, and M=95.

$$M+Y\text{ (mixed color)}=(R+B)+(R+G)=R+(R+G+B)=R+W$$

$$Y+C\text{ (mixed color)}=(R+G)+(B+G)=G+(R+G+B)=G+W$$

$$C+M\text{ (mixed color)}=(G+B)+(R+B)=B+(R+G+B)=B+W$$

Finally, the display controller 200 generates the displayed CMY driving parameter values from the displayed RGB original parameter values for the displayed manner in the above manner. More specifically, for the displayed original parameter values, R=255, G=160, B=80, the following parameter values are obtained after conversion:

The three components of CMY $$Y = \text{white basic amount } 80 + \text{CMY component } 80 + \text{RGB component } 95 = 255$$

$$M = \text{white basic amount } 80 + \text{CMY component } 0 + \text{RGB component } 95 = 175$$

$$C = \text{white basic amount } 80 + \text{CMY component } 0 + \text{RGB component } 0 = 80$$

That is, R=255, G=160, B=80 is converted to Y=255, M=175, C=80.

In addition, in the case of 100% coverage of the filtering color block, the CMY filtering mechanism of the present invention has following performances:

With respect to the white basic quantity, the CMY filtering mechanism of the present invention (briefed as CMY mechanism) is twice as bright as RGB filtering mechanism of the related art (briefed as RGB mechanism).

$$C = B + GM = B + RY = R + G$$

$$C + M + Y = B + G + B + R + R + G = 2(R + G + B) = 2W$$

With respect to the CMY component, the brightness of the CMY mechanism of the present invention is the same as the brightness of the RGB mechanism.

With respect to the RGB component, the CMY mechanism of the present invention increases the white brightness by 1 times compared to RGB mechanism.

Electrophoretic Display Example

Please refer to FIGS. 3A, FIG. 3B, FIG. 4 and the above-mentioned RGB to CMY algorithm description. According to the present invention, the original displayed RGB parameter values for a displayed pixel on the electrophoretic display 100 can be converted into the displayed CMY display parameter values. First, the display controller 200 reads the original displayed RGB parameter value to be for a displayed pixel. For example, the displayed RGB parameters are R=255, G=160, B=80. Afterward, the display controller 200 sets the values of the original displayed RGB parameter value to be to values C1, C2, and C3 based on the order from large to small, where C1 is the maximum value, C3 is the minimum value, and C2 is the middle value. According to the above-mentioned original displayed RGB parameter values, the set results are C1=255, C2=160, and C3=80. Then the display controller 200 calculates the white basic amount, the CMY component, and the RGB component according to the C1, C2, and C3 values.

$$\text{White basic amount } C3 = 80$$

$$\text{CMY main component is } C2 - C3 = 160 - 80 = 80$$

$$\text{RGB component} = C1 - C2 = 255 - 160 = 95$$

Then the display controller 200 calculates the displayed CMY display parameter values based on the white basic amount, CMY main component and RGB component, where $$Y = \text{white basic amount } 80 + \text{CMY component } 80 + \text{RGB component } 95 = 255$$

$$M = \text{white basic amount } 80 + \text{CMY component } 0 + \text{RGB component } 95 = 175$$

$$C = \text{white basic amount } 80 + \text{CMY component } 0 + \text{RGB component } 0 = 80$$

Finally, the display controller 200 drives the corresponding pixel electrode layer PEL according to the displayed CMY display parameter values, so as to control the relative brightness of the cyan, magenta, and yellow filtering color blocks.

Figures 6A, 6B:
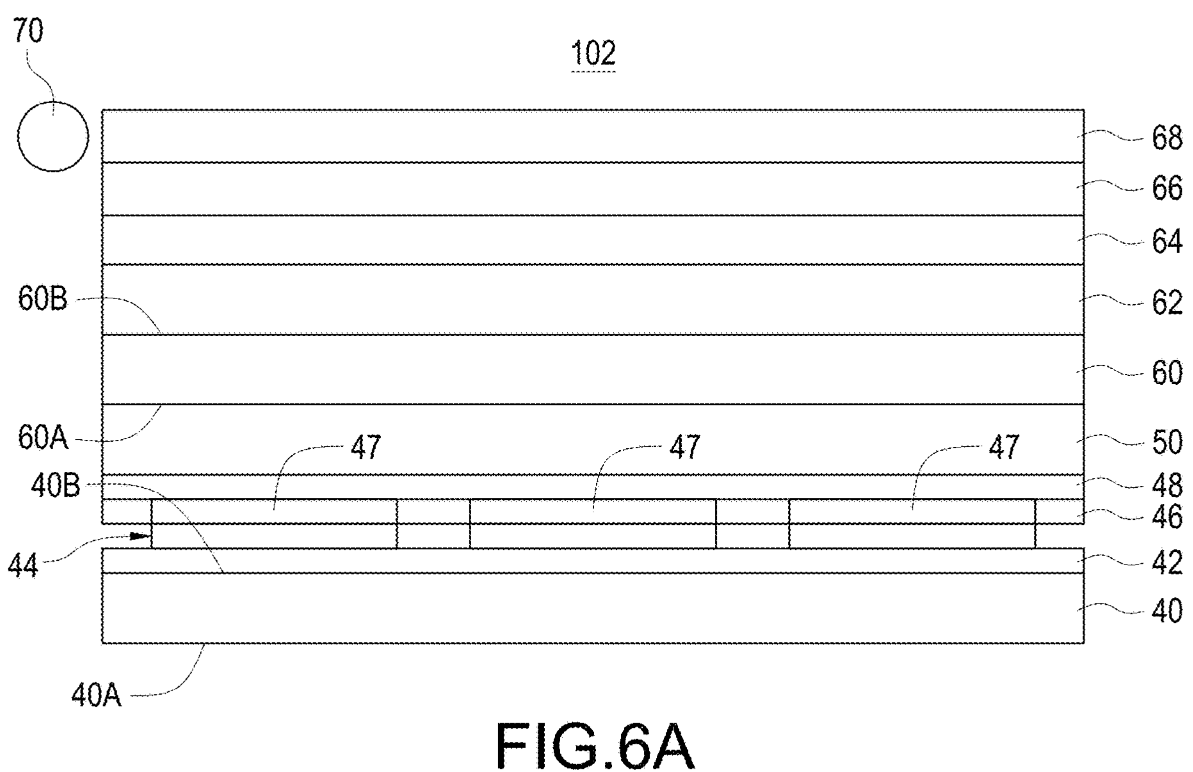
FIG. 6A is a cross-sectional view of the reflective color display according to another embodiment of the present invention.
FIG. 6B is a cross-sectional view of the reflective color display according to another embodiment of the present invention.

Please refer to FIG. 6A, this figure shows the schematic view of a reflective color display 102 according to another embodiment of the present invention. As shown in this figure, the reflective color display 102 includes a first substrate 40 (for example, a transparent substrate and includes a first face 40A and a second face 40B), a thin film transistor layer 46 and a pixel electrode layer 48 arranged on the second face 40B. The thin film transistor layer 46 includes a plurality of thin film transistors 47, and the pixel electrode layer 48 includes a plurality of pixel electrodes. The plurality of pixel electrodes is respectively made of non-transparent metal material or transparent conductive material (such as ITO).

The reflective color display 102 further includes a color filter layer 44. The color filter layer 44 can be, for example, the brightness-enhancing filter layer CFA of the present invention (as shown in FIG. 3C, 3D or 3E), and includes a plurality of color filter units, each of the color filter units includes one or more filtering color blocks, wherein, within the visible light range of 380 nm to 780 nm, at least two color filter units of different colors have a full widths at half maximum (FWHM) of more than 150 nm. The filtering color blocks are, for example, the filtering color blocks CMY (cyan, magenta, and yellow filtering color blocks) as shown in FIG. 3C, 3D or 3E; or the filtering color blocks CMYW (cyan, magenta, yellow, and transparent filtering color blocks); or the filtering color blocks CMYRGB. The filtering color blocks include at least three different colors (for example, the filtering color blocks CMY).

The reflective color display 102 further includes a second substrate 60 (including a third face 60A and a fourth face 60B), and a display material layer 50 sandwiched between the first substrate 40 and the second substrate 60, where the display material layer 50 is filled with a liquid crystal material. Besides, as shown in FIG. 6A, the reflective color display 102 further includes a light reflecting layer 42, which is arranged on the side of the first substrate 40 facing the display material layer 20, that is, on the side of the second face 40B. Furthermore, the light reflection layer 42 is arranged between the first substrate 40 and the pixel electrode layer 48. According to another embodiment of the present invention, the light reflection layer 42 can also be replaced by the pixel electrode layer 48 as the light reflection layer, as long as the pixel electrode layer 48 is made of a conductive material with a high reflectivity. Besides, according to another embodiment of the present invention, under design permission, the light reflection layer 42 can also be arranged on the side of the first substrate 40 facing away from the pixel electrode layer 48, that is, on the first face 40A side (see FIG. 6B). Furthermore, as shown in FIG. 6A, the reflective color display 102 also includes a front scattering layer 62, a phase difference layer 64, a polarizing layer 66 and a light guide plate 68 on the second substrate 60. A light source 70 can be incident on the reflective color display 102 from the light guide plate 68.

Reflective Color Display Example

Please refer to FIGS. 6A, FIG. 6B, FIG. 4 and the above-mentioned RGB to CMY algorithm description. Even not specifically shown in FIGS. 6A and 6B, the reflective color display 100 further includes a display controller 200, which can convert the RGB parameters to be displayed into CMY parameters according to the conversion algorithm of the present invention, which will be described in detail later. According to the present invention, the original displayed RGB parameter values for a displayed pixel on the electrophoretic display 100 can be converted into the displayed CMY display parameter values. First, the display controller 200 reads the original displayed RGB parameter value to be for a displayed pixel. For example, the displayed RGB parameters are R=255, G=160, B=80. Afterward, the display controller 200 sets the values of the original displayed RGB parameter value to be to values C1, C2, and C3 based on the order from large to small, where C1 is the maximum value, C3 is the minimum value, and C2 is the middle value. According to the above-mentioned original displayed RGB parameter values, the set results are C1=255, C2=160, and C3=80. Then the display controller 200 calculates the white basic amount, the CMY component, and the RGB component according to the C1, C2, and C3 values.

$$\text{White basic amount } C3=80$$

$$\text{CMY main component is } C2\text{-}C3=160-80=80$$

$$\text{RGB component}=C1\text{-}C2=255-160=95$$

Then the display controller 200 calculates the displayed CMY display parameter values based on the white basic amount, CMY main component and RGB component, where $$Y=\text{white basic amount } 80+\text{CMY component } 80+\text{RGB component } 95=255$$

$$M=\text{white basic amount } 80+\text{CMY component } 0+\text{RGB component } 95=175$$

$$C=\text{white basic amount } 80+\text{CMY component } 0+\text{RGB component } 0=80$$

Finally, the display controller 200 drives the corresponding pixel electrode layer PEL according to the displayed CMY display parameter values, so as to control the relative brightness of the cyan, magenta, and yellow filtering color blocks.

In summary, the present invention can achieve the following advantages:

(1) The traditional filtering color block RGB is replaced by the filtering color block CMY, the displayed brightness can be increased.

(2) Compared with the related art CMY overlapping color blocks, the color filter unit of the present invention is a filtering color block CMY with single-color single layer structure or single-color multi-layer structure, rather than a multi-color overlapping-layer design. The process can be simplified and the yield rate can be increased.

(3) Due to the improved brightness, the present invention can be advantageously applied to reflective displays without front light devices.

The above-mentioned original displayed RGB parameter values can be modified after the calculation for contrast, brightness, saturation or other processing procedures before starting the CMY value conversion.

The converted white basic amount, the CMY component and the RGB components can also be modified after the calculation for contrast, brightness saturation or other processing procedures before being converted into parameters used to drive pixel electrodes.

While this invention has been described by means of specific embodiments, numerous modifications and variations may be made thereto by those skilled in the art without departing from the scope and spirit of this invention set forth in the claims.

What is claimed is:

1. A reflective color display, comprising:

a first substrate comprising a first face and a second face, a thin film transistor layer arranged on the second face and comprising a plurality of thin film transistors, and a pixel electrode layer arranged on the second face and comprising a plurality of pixel electrodes;

a color filter layer comprising a plurality of color filter units, each of the color filter units being formed by a filtering color block;

wherein the plurality of filter units are corresponding to at least three different colors, wherein within a visible light range of 380 nm~780 nm, at least two color filter units of different colors have full widths at half maximum more than 150 nm;

a second substrate comprising a third face and a fourth face; and a display material layer sandwiched between the first substrate and the second substrate, the display material layer being filled with a colloidal solution containing charged color particles of at least one color;

wherein the color filter layer includes cyan filtering color block, magenta filtering color block, and yellow filtering color block, and wherein when displaying one of red color, blue color, and green color, two of the cyan filtering color block, the magenta filtering color block, and the yellow filtering color block are used.

2. The reflective color display in claim 1, wherein the colloidal solution comprises charged white particles and charged black particles.

3. The reflective color display in claim 1, wherein the colloidal solution comprises charged white particles and a black solution.

4. The reflective color display in claim 3, wherein the color filter layer is arranged on the second substrate, and a viewing surface of the display is on the fourth face of the second substrate.

5. The reflective color display in claim 1, wherein the plurality of pixel electrodes are made of a transparent conductive material, and the first substrate is a transparent substrate.

6. The reflective color display in claim 5, wherein the color filter layer is arranged on the first substrate, and a viewing surface of the color display is the first face of the first substrate.

7. The reflective color display in claim 5, wherein an aperture ratio of the first substrate is not less than 70% along a direction looking from the first face of the first substrate into a display area of the reflective color display.

8. The color display in claim 5, wherein charges on the plurality of pixel electrodes attract the charged color particles with different polarity charges to accumulate on a surface of the display material layer close to the plurality of pixel electrodes, thereby forming an image on a viewing surface.

9. The reflective color display in claim 1, wherein the filtering color blocks of the color filter layer further include transparent filtering color blocks.

10. The color display in claim 1, wherein the display material layer comprises a plurality of hollow cavities formed by micro compartments arranged on the first substrate, and the colloidal solution containing the charged color particles is filled in each of the hollow cavities.

11. A reflective color display, comprising:

a first substrate comprising a first face and a second face, a thin film transistor layer arranged on the second face and comprising a plurality of thin film transistors, and a pixel electrode layer arranged on the second face and comprising a plurality of pixel electrodes;

a color filter layer comprising a plurality of color filter units, each of the color filter units being formed by a filtering color block;

wherein the plurality of color filter units are corresponding to at least three different colors, wherein within a visible light range of 380 nm~780 nm, at least two color filter units of different colors have full widths at half maximum more than 150 nm;

a second substrate comprising a third face and a fourth face; and a display material layer sandwiched between the first substrate and the second substrate, the display material layer being filled with a liquid crystal material;

wherein the color filter layer includes cyan filtering color block, magenta filtering color block, and yellow filtering color block;

wherein when displaying one of red color, blue color, and green color, two of the cyan filtering color block, the magenta filtering color block, and the yellow filtering color block are used.

12. The reflective color display in claim 11, wherein the plurality of pixel electrodes are made of a non-transparent metal material.

13. The reflective color display in claim 11, wherein the plurality of pixel electrodes are made of transparent conductive material, the first substrate is a transparent substrate, and the reflective color display further comprises a light reflection layer.

14. The reflective color display in claim 13, wherein the light reflection layer is arranged on a side of the first substrate facing away from the pixel electrode layer.

15. The reflective color display in claim 13, wherein the light reflection layer is arranged between the first substrate and the pixel electrode layer.

16. The reflective color display in claim 11, further comprising a polarizing layer arranged on the second substrate.

17. The reflective color display in claim 11, wherein a gap is present between the color filter units in the color filter layer.

18. The reflective color display in claim 11, wherein the color filter layer is arranged on the second substrate.

19. The reflective color display in claim 11, wherein the filtering color blocks of the color filter layer further include transparent filtering color blocks.

20. A method for operating reflective color display, the reflective color display comprising a display material layer, a pixel electrode layer and a color filter layer, the pixel electrode layer comprising a plurality of pixel electrodes, pixels of the color display being defined by the plurality of pixel electrodes, the color filter layer comprising a plurality of color filter units, each color filter unit comprising one or more filtering color blocks, the plurality of color filter units comprising at least cyan, magenta and yellow color filter units, the method comprising:

(a) reading original displayed RGB parameter values for a pixel;

(b) setting the original displayed RGB parameter values to values C1, C2, and C3 from large to small, where the value C1 is a maximum value, the value C3 is a minimum value, and the value C2 is a middle value;

(c) calculating white basic amount, CMY component, and RGB component based on the values C1, C2, and C3;

(d) calculating displayed CMY display parameter values based on the white basic amount, the CMY component, and the RGB component; and (e) driving the corresponding pixel electrode layer based on the displayed CMY display parameter values to control relative brightnesses of the cyan, magenta, and yellow color filter units, wherein the white basic amount is the value C3, the CMY component is the value C2 minus the value C3, and the RGB component is the value C1 minus the value C2.

21. The method for operating reflective color display in claim 20, wherein the display material layer is electrophoretic display layer.

22. The method for operating reflective color display in claim 20, wherein the display material layer is liquid display layer.

* * * * *